May 13, 1941.    J. J. HRUSKA    2,241,858
SEGMENTAL SAFETY VEHICLE TIRE
Filed Oct. 28, 1938    2 Sheets-Sheet 1
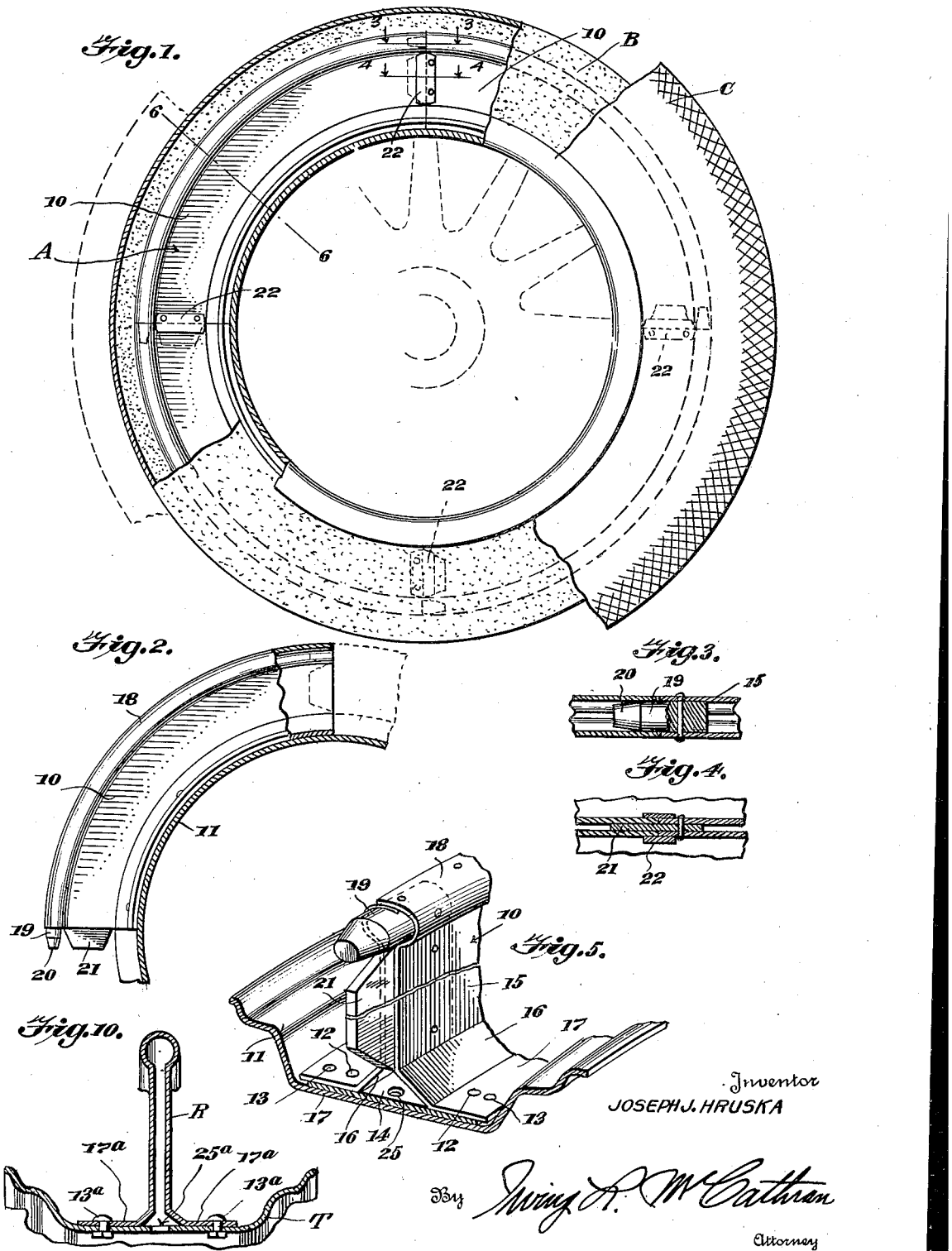
Inventor
JOSEPH J. HRUSKA May 13, 1941.  J. J. HRUSKA  2,241,858
SEGMENTAL SAFETY VEHICLE TIRE
Filed Oct. 28, 1938   2 Sheets-Sheet 2
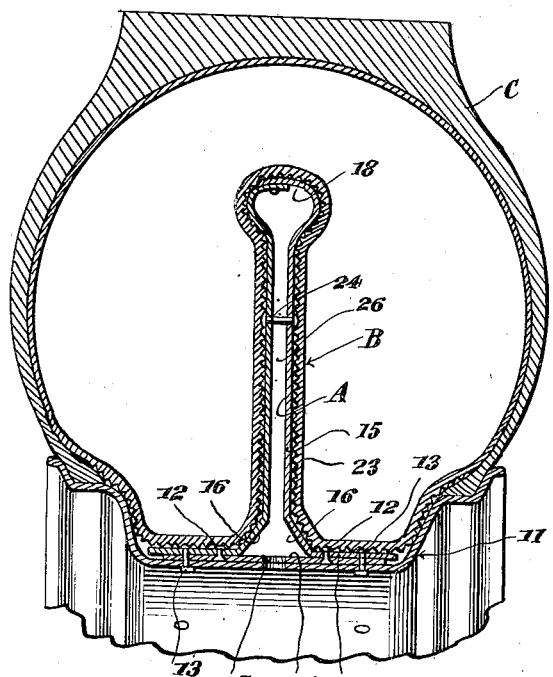
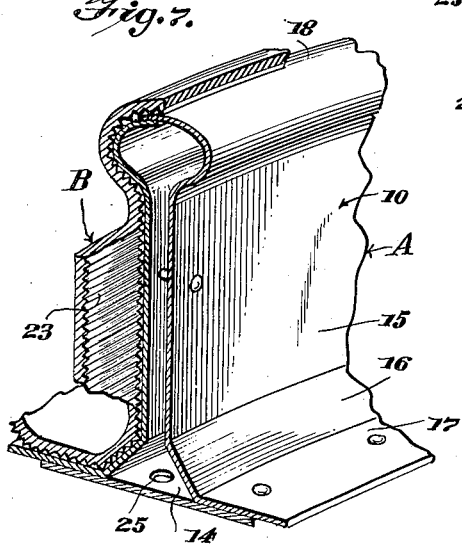
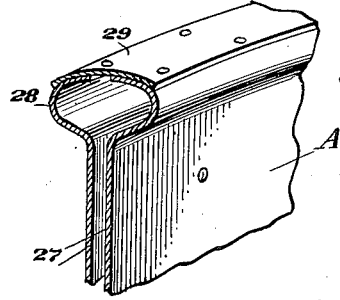
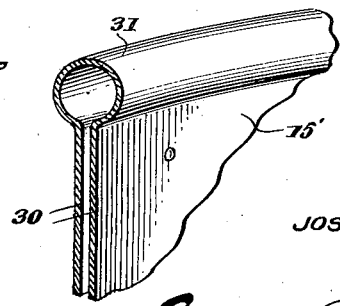
Inventor
JOSEPH J. HRUSKA Patented May 13, 1941

2,241,858

UNITED STATES PATENT OFFICE 2,241,858

SEGMENTAL SAFETY VEHICLE TIRE

Joseph J. Hruska, Milwaukee, Wis.

Application October 28, 1938, Serial No. 237,574

4 Claims. (Cl. 152—158)

This invention relates to safety vehicle tires, and has for one of its objects the production of a simple and efficient means for preventing the collapse of a tire should the same, for any reason, become deflated.

A further object of this invention is the production of a simple and efficient means for joining the various sections of the safety rim together to form an effective emergency support should the tire carried thereby become deflated.

Another object of this invention is the production of a simple and efficient means for holding the inner tube against slipping upon the safety rim.

Other objects and advantages of the present invention will appear throughout the following specification and claims.

The present invention is an improvement upon my previous patent relating to Safety vehicle tires, issued January 18, 1938, #2,105,859.

In the drawings:

Figure 1 is a side elevational view of a vehicle rim and tire, certain parts being shown in section;

Figure 2 is a fragmentary sectional view of a wheel rim, one section of the safety rim being shown;

Figure 3 is a section taken on line 3—3 of Figure 1;

Figure 4 is a section taken on line 4—4 of Figure 1;

Figure 5 is a sectional perspective view through a portion of the rim, showing the end of one safety rim section;

Figure 6 is a transverse sectional view taken on line 6—6 of Figure 1;

Figure 7 is an enlarged sectional perspective view of a portion of the safety rim section and inner tube;

Figure 8 is a sectional perspective view of a modified form of the bead carried by the safety rim;

Figure 9 is a sectional perspective view showing a still further form of bead construction;

Figure 10 is a vertical sectional view through a modified type of the invention wherein the safety rim is directly connected to the tire rim.

By referring to the drawings, it will be seen that A designates the improved safety rim which supports an improved inner tube B, and an outer tire casing C.

The improved safety rim A comprises a plurality of segmental sections 10 which when connected together form a complete safety rim. These sections 10 are secured to a strip 14, which holds the sections 10 from spreading. The rim 11 is adapted to engage the heel portions of a tire in a conventional manner, such as is shown in Figure 6. This mechanism may be attached in any suitable or desired manner, depending upon the type of the wheel upon which the device is used. Each safety rim section 10 comprises a central shank portion 15 consisting of a pair of spaced walls, the lower ends of which are placed at an angle of approximately 45 degrees to provide angle flanges 16 terminating in laterally extending base portions 17. The base portions 17 are secured to the strip 14 by means of rivets 12 and the strip 14 is in turn secured to the rim 11 by bolts 13. The shank portion 15 carries a rolled bead 18 at its outer end, portions of the bead being overlapped and riveted, as shown in Figure 5, which illustrates one method of assembly.

A locking pin 19 is fitted into one end of the bead 18 of each section 10 and secured thereto, the pin 19 having a tapered outer end 20. This tapered outer end 20 of the pin 19 is adapted to fit into the opposite end of the bead of the adjoining safety rim section, in the manner as shown in Figure 1. A tapering anchoring tongue 21 is carried between the walls of the shank 15 at one end of each safety rim section 10, and projects in alignment with the pin 19, this anchoring tongue of each section 10 being adapted to fit in between the spaced walls of the shank 15 of the adjoining section 10, in the manner shown in Figure 1. Suitable closure plates 22 may be secured to the sections 10 to overhang the abutting ends of the sections 10, as shown in Figure 1.

Through the medium of the device illustrated and described a very simple and efficient means is provided for assembling the sections of the safety rim structure, whereby the sections will be firmly tied in assembled relation to constitute a complete circular safety rim which will be thoroughly braced throughout its entire circumference.

The inner tube B is shaped to conform to the contour of the rim A, as shown in Figure 6, as well as to the contour of the inner portion of the tire C. The inner face of the inner tube B is corrugated or roughened in any suitable manner, as indicated by the numeral 23, throughout the entire surface which contacts with the safety rim A, as well as the base structure thereof, and the rim 11. This roughened inner surface may be of any suitable type or design without departing from the spirit of the invention, and the purpose of this roughened inner surface of the inner tube is to make the inner tube stick securely to the safety rim and to resist the spinning action of the tire while the car is running or is in motion. That portion of the inner tube which comes into contact with the tire, however, may remain smooth since an efficient grip will be provided because of the contact of the two yieldable surfaces.

As shown in Figures 6 and 7 the two spaced walls of the shank 15 may be connected or braced by suitable rivets 24, and the strip 14 may be provided with vents or openings 25 suitably located throughout its length and in communication with the space or compartment 26 formed between the side walls of the shank 15. The vents 25 will provide an efficient ventilating means for cooling the tire and inner tube. Suitable vent passages may be formed in the plate, if desired, to connect with these vents 25, depending of course upon the nature of the supporting wheel used. Vents or openings are formed in the rim 11 to communicate with the vents 25.

In Figure 8, there is shown a slightly modified type of the invention wherein the shank A' of the safety rim comprises spaced walls 27 and a bead 28, the sections of the bead 28 being connected by a tread plate 29, as shown in the drawings.

In Figure 9, there is shown a further modified type of the invention wherein the shank 15' of the rim section comprises a pair of spaced walls 30 which support an integral rolled bead 31.

As shown in Figure 10, I have illustrated a safety rim R which is provided with laterally extending base portions 17a, which laterally extending base portion 17a are directly anchored upon the tire rim T by means of securing bolts 13a. In the structure shown in Figure 10 a connecting strip, such as the strip 14 shown in Figure 6 is eliminated. In the structure shown in Figure 10, the rim T is provided with a vent or vent openings 25a similar to the vent openings 25, shown in Figure 7.

As shown in Figures 5 and 6, the inclined flanges 16 will constitute an efficient brace and at the same time eliminate sharp pinching corners into which the inner tube might become crowded and consequently injured.

When assembling the tire and inner tube and weight-supporting rim upon the wheel rim, the following steps are followed: The inner tube is first placed within the tire casing and the tire is then moved transversely of the wheel into place with one bead resting upon the rim beyond the drop center channel thereof and the other bead out of engagement with the rim. This is the step usually followed when applying a tire of this type of a drop channel rim. The bead which has not been moved into engagement with the wheel rim may then be drawn outwardly a sufficient distance to permit the arcuate sections of the weight-supporting rim to be inserted one after another to the center pocket 2 of the tire tube and disposed in end-to-end engagement with each other, the members 20 and 21 of each section engaging the adjacent end of a companion section, as shown in Figure 1. Since the tire is still to some extent in loose engagement with the wheel rim, the operator may reach between the tire and the wheel rim and apply the bolts 13 which project outwardly a sufficient distance for the nuts to be screwed upon the protruding ends of the bolts. The bead of the tire which up to this point has been free from the wheel rim, may now be moved into engagement with the wheel rim in the usual manner and the tire will then be in place about the wheel rim with its beads engaging the side flanges of the wheel rim. The tire tube may now be inflated and the tire will be firmly held in place in inflated condition about the wheel rim. In case the tire is punctured, it may only collapse to the extent permitted by engagement of its tread portion with the outer peripheral edge of the weight-supporting rim.

It should be understood that should the tire become deflated the weight of the car will be taken up by the safety rim and the bead portion 18 of the safety rim will efficiently support the tire, preventing the same from dropping to the rim 11 and at the same time allowing the driver to obtain proper control over the steering of the car.

Certain detail changes in the construction may be employed without departing from the spirit of the invention, so long as such changes fall within the scope of the appended claims.

Having described the invention, what is claimed is:

1. A safety rim of the class described comprising an annular member having spaced walls, means for securing the annular member to a tire rim, means extending transversely of the safety rim for tying the walls against lateral spreading, and the second named means having vents for facilitating the cooling of the interior of the safety rim, the spaced walls being adapted to extend inwardly of a tire, and a bead-like tread portion carried by the inner end of the spaced walls.

2. A safety rim of the class described comprising a plurality of rim sections, each rim section comprising a shank portion and a base portion, the base portion being bolted to a tire rim, the shank portion of each section comprising a pair of spaced walls, a bead-like tread portion carried by the shank portion, a pin carried by one end of each bead portion and adapted to fit into the opposite end of the bead portion of an adjoining section, an anchoring tongue fitted in between the spaced walls of one end of each section and adapted to fit in between the spaced walls of the opposite end of an adjoining section for firmly holding all of the sections in circumferential relation, and means passable through the spaced walls and tongues and serving to hold the walls against lateral expansion and the tongues fixed between said walls.

3. A safety rim of the class described comprising a plurality of rim sections, each rim section comprising a shank portion and a base portion, the base portion being bolted to a tire rim, the shank portion of each section comprising a pair of spaced walls, a bead-like tread portion carried by the shank portion, a pin carried by one end of each bead portion and adapted to fit into the opposite end of the bead portion of an adjoining section, an anchoring tongue fitted in between the spaced walls of one end of each section and adapted to fit in between the spaced walls of the opposite end of an adjoining section for firmly holding all of the sections in circumferential relation, means for holding the spaced walls against lateral expansion, and the ends of the said pins and the ends of said tongues being tapered to facilitate the interfitting of the rim sections together.

4. A safety rim of the class described formed from sheet metal and the like, comprising a shank portion, the shank portion comprising a pair of spaced walls, each wall terminating in a rolled bead, and a reinforcing strip connecting the beads of the respective walls.

JOSEPH J. HRUSKA.